US012190028B2

(12) United States Patent
Kubis et al.

(10) Patent No.: US 12,190,028 B2
(45) Date of Patent: Jan. 7, 2025

(54) METHOD OF MODELING INTERACTIONS BETWEEN MANY PARTICLES

(71) Applicant: Purdue Research Foundation, West Lafayette, IN (US)

(72) Inventors: Tillmann C Kubis, West Lafayette, IN (US); Yuanchen Chu, West Lafayette, IN (US); Kuang-Chung Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1356 days.

(21) Appl. No.: 16/539,995

(22) Filed: Aug. 13, 2019

(65) Prior Publication Data
US 2020/0050960 A1 Feb. 13, 2020

Related U.S. Application Data

(60) Provisional application No. 62/717,943, filed on Aug. 13, 2018.

(51) Int. Cl.
*G06F 30/25* (2020.01)
(52) U.S. Cl.
CPC .................. *G06F 30/25* (2020.01)
(58) Field of Classification Search
CPC ....... G06F 30/25; G06F 2111/10; G06N 7/01; B82Y 10/00

(Continued)

(56) References Cited

U.S. PATENT DOCUMENTS 11,372,948 B2 * 6/2022 Kubis .................... G06F 17/13
2018/0144076 A1 * 5/2018 Liu ........................ G06F 30/33

OTHER PUBLICATIONS

Miao et al., Buttiker probes for dissipative phonon quantum transport in semiconductor nanostructures, Mar. 16, 2016, Appl. Phys. Lett. 108, 113107 (2016), https://pubs.aip.org/aip/apl/article/108/11/113107/30016. (Year: 2016).*

(Continued)

*Primary Examiner* — Tan V Mai
(74) *Attorney, Agent, or Firm* — Purdue Research Foundation

(57) ABSTRACT

A software architecture where the software architecture processes a method, wherein the method includes defining initial conditions for a set of Büttiker probes. The set of Büttiker probes include various interaction equations between one or several many-body systems. The method includes computing properties of particles with quantum transport methods. A quantum transport method of the quantum transport methods include a set of Büttiker probes. The particles include the particles of one or several many-body systems. Further, the method includes calculating a current for each Büttiker probe of the set of Büttiker probes. The current includes at least one of momentum current, particle current, energy current, spin current, color charge or chirality current. The method includes setting up a set of continuity equations such that for each continuity equation a calculated current of a Büttiker probe is in a particular relation with an another calculated current of an another Büttiker probe.

19 Claims, 14 Drawing Sheets

(58) Field of Classification Search
USPC .......................................................... 708/200
See application file for complete search history.

(56) References Cited

OTHER PUBLICATIONS

Aeberhard, U., "Quantum-Kinetic Perspective on Photovoltaic Device Operation in Nanostructure-Based Solar Cells", J. Mater. Res., vol. 33, No. 4, (2018), 14 pages.
Aeberhard, U., "Theory and Simulation of Quantum Photovoltaic Devices Based on the Non-Equilibrium Green's Function Formalism", J Comput Electron (2011) 10:394-413, DOI 10.1007/s10825-011-0375-6, 20 pages.
Anantram, M.P. et al., "Modeling of Nanoscale Devices", Proceedings of the IEEE, vol. 96, No. 9, (2008), 40 pages.
Bufler, F.M. et al., "Monte Carlo, Hydrodynamic and Drift-Diffusion Simulation of Scaled Double-Gate MOSFETs", Journal of Computational Electronics 2, (2003) pp. 81-84.
Burgelman, M. et al., "Modelling Polycrystalline Semiconductor Solar Cells", Thin Solid Films 361+362 (2000), pp. 527-532.
Buttiker, M. et al., "Role of Quantum Coherence in Series Resistors", The American Physical Society, vol. 33, No. 5, (1986), pp. 3020-3026.
Charles, J. et al., "Incoherent Transport in NEMO5: Realistic and Efficient Scattering", on Phonons, J Comput Electron (2016), 8 pages.
Chen, Chin-Yi, et al., "Channel Thickness Optimization for Ultra Thin and 2D Chemically Doped TFETs", IEEE Xplore Digital Library, (2018), 8 pages.
Chen, Chin-Yi, et al., Studying the Short Channel Effect in the Scaling of the AlGaN/GaN Nanowire Transistors, Journal of Applied Physics, 113, (2013), 10 pages.
Datta, S., "Nanoscale Device Modeling: the Green's Function Method", Superlattices and Microstructures, vol. 28, No. 4, (2000), 26 pages.
Dmitriev, A. et al., "The Rate of Radiative Recombination in the Nitride Semiconductors and Alloys", Journal Of Applied Physics, vol. 86, No. 6, (1999), pp. 3241-3246.
Geng, J. et al., "Quantitative Multi-Scale, Multi-Physics Quantum Transport Modeling of GaN-Based Light Emitting Diodes," Phys. Status Solidi A, 215, (2018), 7 pages.
Ghedini, P. et al., "Temperature Impact on the Tunnel Fet Off-State Current Components," Solid-State Electronics, 78, (2012), pp. 141-146.
Greck, P. "Efficient Calculation of Dissipative Quantum Transport Properties in Semiconductor Nanostructures," Technische Universität München, Physik-Department, Institut für Theoretische Physik, Lehrstuhl Univ.- Prof. Dr. Peter Vogl, (2012), 149 pages.
Greck, P. et al., "Efficient Method for the Calculation of Dissipative Quantum Transport in Quantum Cascade Lasers," Optics Express 6587, vol. 23, No. 5, (2015), 14 pages.
Hopkins, P.E., "Multiple Phonon Processes Contributing to Inelastic Scattering During Thermal Boundary Conductance at Solid Interfaces," J. Appl. Phys. 106, (2009), 10 pages.
Huang, J.Z. et al., "Finite Difference Schemes for k · p Models: A Comparative Study," IEEE, (2015), 3 pages.
Jirauschek, C. et al., "Modeling Techniques for Quantum Cascade Lasers," Appl. Phys. Rev. 1, (2014), 52 pages.
Kim, Min-Ho, et al., "Origin of Efficiency Droop in GaN-Based Light-Emitting Diodes," Applied Physics Letters 91, (2007), 3 pages.
Klimeck, G. et al., "Quantum Device Simulation with a Generalized Tunneling Formula," Appl. Phys. Lett. 67, (17) (1995), pp. 2539-2541.
Knoch, J. et al., "Impact of the Dimensionality on the Performance of Tunneling FETs: Bulk Versus One-Dimensional Devices," Science Direct, Solid-State Electronics 51 (2007) pp. 572-578.

Krogstrup, P. et al., "Single-Nanowire Solar Cells Beyond the Shockley-Queisser Limit," Nature Photonics, vol. 7 (2013), pp. 305-310.
Kubis, T. et al., "Assessment of Approximations in Nonequilibrium Green's Function Theory," APS Physics. Rev. B, 83, (2011) 15 pages.
Kubis, T. et al., "Theory of Nonequilibrium Quantum Transport and Energy Dissipation in Terahertz Quantum Cascade Lasers," Physical Review B, 79, (2009), 10 pages.
Lang, J.R. et al., "Carrier Escape Mechanism Dependence on Barrier Thickness and Temperature in InGaN Quantum Well Solar Cells," Appl. Phys. Lett. 101, (2012), 7 pages.
Luisier, M., "Atomistic Modeling of Anharmonic Phonon-Phonon Scattering in Nanowires," APS Physics, Phys. Rev. B, 86, (2012), 21 pages.
Matyas, A. et al., "Comparison Between Semiclassical and Full Quantum Transport Analysis of THz Quantum Cascade Lasers d," Physica E 42, (2010), pp. 2628-2631.
Miao, K. et al., "Buttiker Probes for Dissipative Phonon Quantum Transport in Semiconductor Nanostructures," Applied Physics Letters 108, (2016), 6 pages.
Winatsakanov, T.T. et al., "Carrier Mobility Model for GaN," Solid-State Electronics 47, (2003), pp. 111-115.
Moradinasab, M. et al., "Numerical Study of Graphene Superlattice-Based Photodetectors," IEEE Transactions on Electron Devices, vol. 62, No. 2 (2015), pp. 593-600.
Pimputkar, S. et al., "Prospects for LED Lighting," Nature Photonics, vol. 3, (2009), pp. 179-182.
Piprek, J. "Efficiency Droop in Nitride-Based Light-Emitting Diodes," Phys. Status Solidi A, (2010), pp. 1-9.
Plimpton, S. "Fast Parallel Algorithms for Short-Range Molecular Dynamics," SAND91-1144, Unlimited Release, Printed May 1993, Applied Mathematical Sciences Program, U.S. Department of Energy, Office of Energy Research, and was performed at Sandia National Laboratories, operated for the DOE under Contract No. DE-AC04-76DP00789, 44 pages.
Sadasivam, S. et al., "Thermal Transport Across Metal Silicide-Silicon Interfaces: First-Principles Calculations and Green's Function Transport Simulations," APS Physics, Phys. Rev. B 95, (2017), 37 pages.
Sancho, Lopez, M.P. et al., "Highly Convergent Schemes for the Calculation of Bulk and Surface Green Functions," J. Phys. F: Met Phys. 15 (1985) pp. 851-858.
Sancho, Lopez, M.P. et al., "Quick Iterative Scheme for the Calculation of Transfer Matrices: Application to MO( 100)," J. Phys. F: Met. Phys. 14 (1984) pp. 1205-1215.
Sarangapani, P. et al., "Nonequilibrium Green's Function Method: Transport and Band Tail Predictions in Transition Metal Dichalcogenides," IEEE (2018) 2 pages.
Schelling, P.K. et al., "Comparison of Atomic-Level Simulation Methods for Computing Thermal Conductivity," Physical Review B. Vol. 65 (2002), p. 144306-1-144306-12.
Sellan, D.P. et al., "Size Effects in Molecular Dynamics Thermal Conductivity Predictions," Physical Review B 81, (2010), pp. 214305-1-214305-10.
Steiger, S. et al., "NEMO5: A Parallel Multiscale Nanoelectronics Modeling Tool," IEEE Transactions on Nanotechnology, vol. 10, No. 6 (2011), 12, pp. 1463-1474.
Svizhenko, A. et al., "Two-Dimensional Quantum Mechanical Modeling of Nanotransistors," Journal of Applied Physics, vol. 91, No. 4 (2002), 14 pages.
Tsai, Meng-Lin et al., "Monolayer MoS2 Heterojunction Solar Cells," Acs Nano, vol. 8, No. 8 (2014), pp. 8317-8322.
Valencia, D. et al., "Grain-Boundary Resistance in Copper Interconnects: From an Atomistic Model to a Neural Network," APS Physics, Phys Rev. Applied 9, (2018), 21 pages.
Valencia, D. et al., "Grain-Boundary Resistance in Nanoscale Copper Interconnections," IEEE, Simulation of Semiconductor Processes and Devices (2016), 5 pages.
Venugopal, R. et al., "A Simple Quantum Mechanical Treatment of Scattering in Nanoscale Transistors," Journal of Applied Physics, vol. 93, No. 9 (2003), pp. 5612-5625.

(56) References Cited

OTHER PUBLICATIONS

Wang, J. et al., "A Three-Dimensional Quantum Simulation of Silicon Nanowire Transistors with the Effective Mass Approximation," Journal of Applied Physics, vol. 96, No. 4 (2004) pp. 2191-2203.
Wang, K.C. et al., "Control of Interlayer Physics in 2H Transition Metal Dichalcogenides," Journal of Applied Physics, 122 (2017) 10 pages.
Wu, J. et al., "Superior Radiation Resistance of In1−xGaxN Alloys: Full-Solar-Spectrum Photovoltaic Material System," Journal of Applied Physics, vol. 94, No. 10 (2003), pp. 6476-6482.
Wu, Y-R. et al., "Analyzing the Physical Properties of InGaN Multiple Quantum Well Light Emitting Diodes from Nano Scale Structure," Applied Physics Letters, 101, (2012), 6 pages.
Zahid, F. et al., "A Self-Consistent Transport Model for Molecular Conduction Based on Extended Hückel Theory with Full Three-Dimensional Electrostatics," The Journal of Chemical Physics 123 (2005) 11 pages.
Anantram, M.P. et al., "Modeling of Nanoscale Devices", arXiv. cond-mat/0610247v2, Feb. 20, 2007; 42 pages.
Britnell, L. et al., "Resonant Tunnelling and Negative Differential Conductance in Graphene Transistors", Nature Communications (2013); 5 pages.
De Falco, C. et al., "Quantum Corrected Drift-Diffusion Models: Solution Fixed Point Map and Finite Element Approximation", Journal of Computational Physics (2008); 34 pages.
Frisenda, R. et al., "Atomically Thin p-n Junctions Based on Two-Dimensional Materials", Chem. Soc. Rev., 2018, 47, pp. 3339-3358.
Geim, A.K. et al., "Van der Waals Heterostructures", School of Physics & Astronomy & Centre for Mesoscience & Nanotechnology—University of Manchester; 12 pages.
Geng, J. et al., "Quantitative Multi-Scale, Multi-Physics Quantum Transport Modeling of GaN-Based Light Emitting Diodes", Phys. Status Solidi A (2018); 7 pages.
Gong, K. et al., "Electrical Contacts to Monolayer Black Phosphorus: A First-Principles Investigation", Physical Review B, 90 (2014); 7 pages.
Grimme, S. "Semiempirical GGA-Type Density Functional Constructed with a Long-Range Dispersion Correction", Grimme, vol. 27, No. 15; Journal of Computational Chemistry (2006); pp. 1787-1799.
Huang, M. et al., "Multifunctional High-Performance Van Der Waals Heterostructures", Nature Nanotechnology, vol. 12; (2017) 9 pages.
Tlatikhameneh, H. et al., "Tunnel Field-Effect Transistors in 2-D Transition Metal Dichalcogenide Materials", IEEE Journal on Exploratory Solid-State Computational Devices and Circuits (2015) pp. 12-18.
Jariwala, D. et al., "Emerging Device Applications for Semiconducting Two-Dimensional Transition Metal Dichalcogenides", 55 pages.
Jariwala, D. et al., "Gate-Tunable Carbon Nanotube-MoS2 Heterojunction p-n Diode", PNAS, vol. 110, No. 45 (2013); pp. 18076-18080.
Jariwala, D. et al., "Large-Area, Low-Voltage, Anti-Ambipolar Heterojunctions from Solution-Processed Semiconductors", 30 pages.
Jariwala, D. et al., "Mixed-Dimensional van der Waals Heterostructures", 41 pages.
Kim, J-K. et al., "Trap-Mediated Electronic Transport Properties of Gate-Tunable Pentacene/MoS2 p-n Heterojunction Diodes", Scientific Reports; www.nature.com/scientificreports (2016); 8 pages.
Kobashi, K. et al., "Negative Differential Resistance Transistor with Organic p-n Heterojunction", Advanced Electronic Materials (2017); 7 pages.
Koswatta, S.O. et al., "Performance Comparison Between p-i-n Tunneling Transistors and Conventional MOSFETs", IEEE Transactions on Electron Devices; Source: IEEE Xplore (2009); 38 pages.
Landry, E.S. et al., "Thermal Boundary Resistance Predictions from Molecular Dynamics Simulations and Theoretical Calculations", Physical Review B 80; (2009); 11 pages.
Lee, C-H. et al., "Atomically Thin p-n Junctions with Van Der Waals Heterointerfaces", 29 pages.
Li, M-Y et al., "Epitaxial Growth of a Monolayer WSe2-MoS2 Lateral p-n Junction with an Atomically Sharp Interface", Nanoelectronics; vol. 349, Issue 6247 (2015); 6 pages.
Lin, Z. et al., "2D Materials Advances: from Large Scale Synthesis and Controlled Heterostructures to Improved Characterization Techniques, Defects and Applications", 2D Mater. 3 (2016); 39 pages.
Marzari, N. et al., "Maximally Localized Generalized Wannier Functions for Composite Energy Bands", Physical Review B, vol. 56, No. 20 (1997); 19 pages.
Paul, A. et al., "Modified Valence Force Field Approach for Phonon Dispersion: from Zinc-Blende Bulk to Nanowires", Journal of Computational Electronics; arXiv: 1009.6188v2 [cond-mat.meshall] (2010); 13 pages.
Prakash, A. et al., "Understanding Contact Gating in Schottky Barrier Transistors from 2D Channels", Scientific Reports, 7; (2017); 9 pages.
Pugh, S.K. et al., "Electronic Structure Calculations on Nitride Semiconductors", Department of Physics, University of Durham; 20 pages.
Roy, T. et al., "Dual-Gated MoS2/WSe2 van der Waals Tunnel Diodes and Transistors", American Chemical Society; 15 pages.
Sangwan, V.K. et al., "Electronic Transport in Two-Dimensional Materials", Support from the National Science Foundation Materials Research Science and Engineering Center, DMR-1720139 and 2-DARE Program (EFRI-1433510); 27 pages.
Sangwan, V.K. et al., "Self-Aligned van der Waals Heterojunction Diodes and Transistors", 23 pages.
Sarkar, D. et al., "A Subthermionic Tunnel Field-Effect Transistor with an Atomically Thin Channel", Macmillan Publishers Limited, vol. 526 (2015); 6 pages.
Schwierz, F. et al., "Two-Dimensional Materials and their Prospects in Transistor Electronics, Nanoscale, 7, (2015); 2 3 pages.
Szabo, A. et al., "Ab-initio Simulation of Single-and few-Layer MoS2 Transistors: Effect of Electron-Phonon Scattering"; 11 pages.
Wakayama, Y. et al., "Antiambipolar Transistor: A Newcomer for Future Flexible Electronics", Adv. Funct. Mater. (2019); 11 pages.
Yu, H. et al., "Carrier Delocalization in Two-Dimensional Coplanar p-n Junctions of Graphene and Metal Dichalcogenides", Nano Lett., 16 (2016); 5 pages.
Schelling, P.K. et al., "Comparison of Atomic-Level Simulation Methods for Computing Thermal Conductivity," Physical Review B. Vol. 65 (2002), pp. 144306-1-144306-12.

\* cited by examiner

METHOD OF MODELING INTERACTIONS BETWEEN MANY PARTICLES

CROSS-REFERENCE TO RELATED APPLICATIONS

The present U.S. patent application is related to and claims the priority benefit of U.S. Provisional Patent Application Ser. No. 62/717,943, filed Aug. 13, 2018, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

State of the art logic devices have reached nanometer length scales. On these dimensions, physical phenomena are maintained by particles that face pronounced coherent wave effects, such as confinement, interference and tunneling. Since these devices are run at temperatures at and beyond room temperature and since the mass production of these devices (e.g. billions of transistors in one CPU) faces unavoidable imperfections (variations in device size, surface or interface quality, random doping, alloy disorder, etc.), any reliable nanodevice performance prediction has to include incoherent scattering on fluctuations and imperfections, too.

Including incoherent scattering in wave-mechanics compatible models is typically increasing the numerical burden of the predictive model by orders of magnitude. This is particularly true for the nonequilibrium Green's function method—a method commonly used to predict nanodevice performances due to its consistent treatment of coherent and incoherent quantum physics. Among the few established methods to incorporate incoherent scattering are the Büttiker probes.

SUMMARY

One aspect of the present application relates to a software architecture encoded on a non-transitory computer readable medium, the software architecture processing a method, wherein the method includes defining initial conditions for a set of Büttiker probes, wherein the set of Büttiker probes include various interaction equations between at least one of electrons, holes, photons, and phonons. The method additionally includes computing properties of particles with quantum transport methods, wherein a quantum transport method of the quantum transport methods include a set of Büttiker probes, wherein the particles comprise at least one of electrons, holes, photons, or phonons. Additionally, the method includes calculating a current for each Büttiker probe of the set of Büttiker probes, wherein the current includes at least one of momentum current, particle current, energy current, spin current, or chirality current. Further, the method includes setting up a set of continuity equations such that for each continuity equation a calculated current of a Büttiker probe is in a particular relation with an another calculated current of an another Büttiker probe. Moreover, the method includes redefining conditions for a second set of Büttiker probes such that each continuity equation of the set of continuity equations is conserved, wherein each continuity equation is conserved with a corresponding Büttiker probe of the second set of Büttiker probes.

Another aspect of the present application relates to a software architecture encoded on a non-transitory computer readable medium, the software architecture processing a method, wherein the method includes defining initial conditions for a set of Büttiker probes, wherein the set of Büttiker probes include various interaction equations between one or several many-body systems. Additionally, the method includes computing properties of particles with quantum transport methods, wherein a quantum transport method of the quantum transport methods include a set of Büttiker probes, wherein the particles include the particles of one or several many-body systems. Further, the method includes calculating a current for each Büttiker probe of the set of Büttiker probes, wherein the current includes at least one of momentum current, particle current, energy current, spin current, color charge or chirality current. Moreover, the method includes setting up a set of continuity equations such that for each continuity equation a calculated current of a Büttiker probe is in a particular relation with an another calculated current of an another Büttiker probe.

Still another aspect of the present application relates to a software architecture encoded on a non-transitory computer readable medium, the software architecture processing a method, wherein the method includes defining initial conditions for a set of Büttiker probes, wherein the set of Büttiker probes include various interaction equations between one or several many-body systems. Additionally, the method includes computing properties of particles with quantum transport methods, wherein a quantum transport method of the quantum transport methods include a set of Büttiker probes, wherein the particles include the particles of one or several many-body systems. Further, the method includes calculating a current for each Büttiker probe of the set of Büttiker probes, wherein the current includes at least one of momentum current, particle current, energy current, spin current, color charge or chirality current. Moreover, the method includes setting up a set of continuity equations such that for each continuity equation a calculated current of a Büttiker probe is in a particular relation with an another calculated current of an another Büttiker probe. Furthermore, the method includes redefining conditions for a second set of Büttiker probes such that each continuity equation of the set of continuity equations is conserved, wherein each continuity equation is conserved with a corresponding Büttiker probe of the second set of Büttiker probes.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

Figure 1:
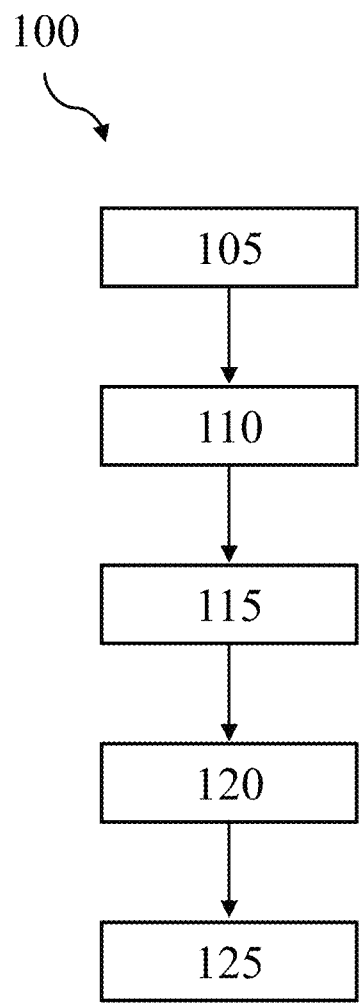
FIG. 1 illustrates a method 100 of modeling interactions between many particles, in accordance with one or more embodiments.

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Büttiker probes were originally developed to include incoherent thermalization of electrons in 1D transport situations. Later the concept was extended to phonons and atomic 3D crystals. Each probe represents a scattering center that allows incoming particles (state of the art: either electrons or phonons) to leave the device with a probability related to the scattering strength of the probe. In case of electrons, the lost device electron is replaced by a probe electron with the probe's thermalized distribution function to maintain the electron number conservation. Since the phonon number is not conserved, lost phonon energy is replaced with the energy of the incoming phonon Büttiker probes probe phonons to maintain energy conservation.

The numerical solution of Büttiker probes requires the iterative determination of the Büttiker probes properties (state of the art: chemical potential for electrons, temperature for phonons). In the simplest case, the nanodevice contains a single Büttiker probe. After an initial guess for the electronic Büttiker probe chemical potential or the phonon Büttiker probe temperature, the quantum transport method that uses the Büttiker probe is applied. In case of the nonequilibrium Green's function method, the Green's functions are solved with the self-energies that represent the Büttiker probe. The particle (for electrons) or energy (for phonons) conservation represented by the single continuity equation for the single probe requires the particle or energy current flowing into and out of the probe to cancel. To achieve that requires the iterative adjustment of the probe properties and the subsequent solution of the quantum transport equations to get the probe current input for the continuity equation.

In this technology, the Büttiker probe method is enhanced to allow for the modeling of the interaction between different particle types and the mutual exchange of properties, such as e.g. energy and momentum. The Büttiker probes include different intraparticle interactions as is state of the art already (e.g. the anharmonic phonon-phonon decay, the electron-electron interaction, the scattering at rough interfaces etc.). In addition, they can include the scattering between the particle types, such as the scattering of electrons on phonons, the recombination of electrons and holes by the emission of phonons or photons, or the absorption of photons and conversion of the photon energy into a pair of electrons and holes. For this purpose, the Büttiker probes, quantum transport equations and particle, energy and/or momentum current densities are solved at each probe for each particle type.

For instance, in the case of electron-hole recombination, at each iterative solution of quantum transport equations and Büttiker probe current densities, the particle loss of electrons and holes is determined with the loss rate at each Büttiker probe. The properties of the two types of Büttiker probes require two conditions to be determined: the first condition is that electron and hole loss (i.e. recombination of the two) matches each other, and the second is that the energy of the recombining electron and hole get transferred as source term to the photon energy continuity equation. The increased energy of the photon system increases the likelihood of photon absorption and thus electron and hole generation. This is reflected in the photon number dependent scattering strength of the respective retarded Büttiker probe self-energy of holes and electrons.

In the most common quantum transport method that supports Büttiker probes, i.e. the nonequilibrium Green's function method, the Büttiker probes are represented by the retarded and in-scattering (also called "lesser") self-energies. In time dependent models, a third self-energy often the out-scattering (also called "greater") self-energy is given. In other models these self-energies are translated into different ones, such as the causal and anti-causal self-energies. Methods such as the Wigner function approach, the density matrix method and the Monte Carlo method derive their scattering terms from these self-energies by transformation into Wigner coordinates, by integration over energy and by applying the Gradient approximation, respectively.

The interaction strength between different particle types enters the Büttiker probe via the retarded self-energy in terms of a scattering Hamiltonian multiplied with a given probe retarded Green's function that describes the density of states of the probe particles. The interaction Hamiltonian between electrons, phonons and photons is given by state of the art many particle methods. These Hamiltonians are typically derived involving the Schrödinger equation, the Heisenberg equation, the Fermi's golden rule, the Maxwell equations, the Newton equation, or the Langevin equation or other equations of motion.

Alternatively, experimental results of the spectral width of the particle's state can be directly translated into the imaginary part of the retarded self-energy. The real part can e.g. be deduced from the imaginary part via the Kramers-Kronig relation. Causal and anti-causal self-energies are linearly depending on the retarded, in-scattering and out-scattering ones and do not host extra information. They can be used instead of retarded, in-scattering and out-scattering if the user decides so.

The conservation of continuity equations is tightly related to the in-scattering and out-scattering self-energies. These self-energies are depending on the retarded self-energy and a distribution function of the probe particles. This distribution function is adjusted iteratively via the Büttiker probe properties to conserve the continuity equations. Depending on whether particle, momentum, energy or any other particle property is considered in the specific continuity equations, the probe distribution functions will converge to different shapes and values. The extension of the presented technology alters the continuity equations of each particle type by the mutually exchanged properties. In case electrons emit (absorb) phonons, the energy change of the electron gas enters the phonon Büttiker probe energy continuity equation as a source (drain) term. The affected phonon gas responds in the iterative adjustment of the probe properties with changes of the phonon temperature. This in turn alters the electron scattering strength in the retarded Büttiker probe self-energy since the electron-phonon Hamiltonian is depending on the phonon temperature.

For the interaction of electrons, holes and photons, such as in the case of solar cells, the particle continuity equation of electrons and holes is altered by the recombination rate deduced (with e.g. the ABC rule) from the electron and hole densities. The electron and hole loss at the Büttiker probes has to equal the recombination rate (i.e. the probe current equals that loss). The electron and hole energy current at the Büttiker probes is then input to the energy continuity equations of the photons (just like in the phonon case). Increased photon temperatures counteract on the electron and hole recombination rate since the stimulated emission is photon density and thus photon temperature dependent.

Transport methods other than the nonequilibrium Green's function method require the translation of the self-energies into the respective scattering terms (as discussed above). Any transport theory has to conserve the same continuity equations discussed above with the same source and drain terms that describe the mutual interaction with other particle types.

Since the Büttiker probe method is a general many-body method, this technology of extended Büttiker probes is applicable to any many-body system that mutually exchanges properties with one or several other many-body systems. The exchanged property is conserved via the source and drain terms at each Büttiker probe. The interaction strength of the Büttiker probes is either known due to given Hamiltonian operators (see above) or it can be directly deduced from Fermi's golden rule or experimental linewidth data: the scattering rate solved with Fermi's golden rule is closely related to the imaginary part of the retarded self-energy of the Büttiker probes and same is true for the experimental state linewidth. As discussed above, the real part of the retarded self-energy can be determined with the Kramers-Kronig relation. The remaining unknown, i.e. the distribution functions that determine the in-scattering and out-scattering self-energies of the Büttiker probes represent the distribution functions the many-particle system relaxes into in equilibrium. This is the Fermi distribution function for Fermions and the Bose distribution function for Bosons. All other processes described above, such as the iterative solution of the Büttiker probes and their properties applies to any many-body system straightforwardly.

Example 1

A software architecture encoded on a non-transitory computer readable medium, the software architecture processing a method 100, wherein the method includes defining 105 initial conditions for a set of Büttiker probes, wherein the set of Büttiker probes include various interaction equations between at least one of electrons, holes, photons, and phonons. The method additionally includes computing 110 properties of particles with quantum transport methods, wherein a quantum transport method of the quantum transport methods include a set of Büttiker probes, wherein the particles comprise at least one of electrons, holes, photons, or phonons. Additionally, the method includes calculating 115 a current for each Büttiker probe of the set of Büttiker probes, wherein the current includes at least one of momentum current, particle current, energy current, spin current, or chirality current. Further, the method includes setting up 120 a set of continuity equations such that for each continuity equation a calculated current of a Büttiker probe is in a particular relation with an another calculated current of an another Büttiker probe. Moreover, the method includes redefining 125 conditions for a second set of Büttiker probes such that each continuity equation of the set of continuity equations is conserved, wherein each continuity equation is conserved with a corresponding Büttiker probe of the second set of Büttiker probes.

The set of continuity equations includes at least one continuity equation. In one or more embodiments, each continuity equation of the set of continuity equation is dependent upon the computed properties of the particles. In at least one embodiment, the set of continuity equations comprise at least one of: particle continuity, energy conservation, momentum conservation, angular momentum conservation, spin conservation, or an n-th order momentum conservation, where n is greater than 2. In some embodiments, at least one of continuity equation of the set of continuity equations depends on at least one of the computed properties of particles. In some embodiments, at least one of continuity equation of the set of continuity equations depends on at least one of the properties of particles. The initial conditions of example 1 include at least one of temperature, chemical potential, electrostatic potential, mobility, particle distribution, interaction strengths, energy distribution, intrinsic correlation between multiple Büttiker probes, or momentum distribution. The quantum transport methods include at least one of: a non-equilibrium Green's function method; a density matrix method; a quantum Monte Carlo method; a Wigner function method; a Monte Carlo method; or a Boltzmann transport method.

In some embodiments, the set of Büttiker probes includes at least one Büttiker probe. The set of Büttiker probes includes at least one of a self-energy; a retarded self-energy; an in-scattering self-energy; an out-scattering self-energy; an advanced self-energy; a causal self-energy; or an anti-causal self-energy. In some embodiments, the set of Büttiker probes include at least one of a constant, energy dependent function, momentum dependent function, or spatial dependent function. The properties of particles of example 1 include at least one of distribution function, optical response function, charge response function, magnetic response function, general susceptibility function or screening properties.

In one or more embodiments, the distribution function comprises at least one of momentum distribution, energy distribution, or spatial distribution. The particular relation of example 1 includes at least one of: polynomial expressions, differential expressions, or integro-differential expressions.

Example 1 a software architecture encoded on a non-transitory computer readable medium, the software architecture processing a method 100, wherein the method includes defining 105 initial conditions for a set of Büttiker probes, wherein the set of Büttiker probes include various interaction equations between at least one of electrons, holes, photons, and phonons. The method additionally includes computing 110 properties of particles with quantum transport methods, wherein a quantum transport method of the quantum transport methods include a set of Büttiker probes, wherein the particles comprise at least one of electrons, holes, photons, or phonons. Additionally, the method includes calculating 115 a current for each Büttiker probe of the set of Büttiker probes, wherein the current includes at least one of momentum current, particle current, energy current, spin current, or chirality current. Further, the method includes setting up 120 a set of continuity equations such that for each continuity equation a calculated current of a Büttiker probe is in a particular relation with an another calculated current of an another Büttiker probe. Moreover, the method includes redefining 125 conditions for a second set of Büttiker probes such that each continuity equation of the set of continuity equations is conserved, wherein each continuity equation is conserved with a corresponding Büttiker probe of the second set of Büttiker probes.

The set of continuity equations includes at least one continuity equation. In one or more embodiments, each continuity equation of the set of continuity equation is dependent upon the computed properties of the particles. In at least one embodiment, the set of continuity equations include at least one of: particle continuity, energy conservation, momentum conservation, angular momentum conservation, spin conservation, or an n-th order momentum conservation, where n is greater than 2. In some embodiments, at least one of continuity equation of the set of continuity equations depends on at least one of the computed properties of particles. In some embodiments, at least one of continuity equation of the set of continuity equations depends on at least one of the properties of particles. The initial conditions of example 1 include at least one of temperature, chemical potential, electrostatic potential, mobility, particle distribution, interaction strengths, energy distribution, intrinsic correlation between multiple Büttiker probes, or momentum distribution. The quantum transport methods include at least one of: a non-equilibrium Green's function method; a density matrix method; a quantum Monte Carlo method; a Wigner function method; a Monte Carlo method; or a Boltzmann transport method.

In some embodiments, the set of Büttiker probes includes at least one Büttiker probe. The set of Büttiker probes includes at least one of a self-energy; a retarded self-energy; an in-scattering self-energy; an out-scattering self-energy; an advanced self-energy; a causal self-energy; or an anti-causal self-energy. In some embodiments, the set of Büttiker probes include at least one of a constant, energy dependent function, momentum dependent function, or spatial dependent function. The properties of particles of example 1 include at least one of distribution function, optical response function, charge response function, magnetic response function, general susceptibility function or screening properties. In one or more embodiments, the distribution function comprises at least one of momentum distribution, energy distribution, or spatial distribution. The particular relation of example 1 includes at least one of: polynomial expressions, differential expressions, or integro-differential expressions.

One of ordinary skill in the art would recognize that operations are added or removed from method 100, in one or more embodiments. One of ordinary skill in the art would also recognize that the order of the operations in method 100 is varied in various alternative embodiments.

Example 2

A software architecture includes a first protocol, wherein the first protocol is configured to define initial conditions for a set of Büttiker probes. The set of Büttiker probes include various interaction equations between at least one of electrons, holes, photons, and phonons. The software architecture additionally includes a second protocol, wherein the second protocol is configured to compute properties of particles with quantum transport methods. A quantum transport method of the quantum transport methods include a set of Büttiker probes. The particles comprise at least one of electrons, holes, photons, or phonons. Additionally, the software architecture includes a third protocol, wherein the third protocol is configured to calculate a current for each Büttiker probe of the set of Büttiker probes. The current includes at least one of momentum current, particle current, energy current, spin current, or chirality current. Further, the software architecture includes a fourth protocol, wherein the fourth protocol is configured to set up a set of continuity equations such that for each continuity equation a calculated current of a Büttiker probe is in a particular relation with an another calculated current of an another Büttiker probe. Moreover, the software architecture includes a fifth protocol, wherein the fifth protocol is configured to redefine conditions for a second set of Büttiker probes such that each continuity equation of the set of continuity equations is conserved. Each continuity equation is conserved with a corresponding Büttiker probe of the second set of Büttiker probes.

The set of continuity equations includes at least one continuity equation. In one or more embodiments, each continuity equation of the set of continuity equation is dependent upon the computed properties of the particles. In at least one embodiment, the set of continuity equations include at least one of: particle continuity, energy conservation, momentum conservation, angular momentum conservation, spin conservation, or an n-th order momentum conservation, where n is greater than 2. In some embodiments, at least one of continuity equation of the set of continuity equations depends on at least one of the computed properties of particles. In some embodiments, at least one of continuity equation of the set of continuity equations depends on at least one of the properties of particles. The initial conditions of example 2 include at least one of temperature, chemical potential, electrostatic potential, mobility, particle distribution, interaction strengths, energy distribution, intrinsic correlation between multiple Büttiker probes, or momentum distribution. The quantum transport methods include at least one of: a non-equilibrium Green's function method; a density matrix method; a quantum Monte Carlo method; a Wigner function method; a Monte Carlo method; or a Boltzmann transport method.

In some embodiments, the set of Büttiker probes includes at least one Büttiker probe. The set of Büttiker probes includes at least one of a self-energy; a retarded self-energy; an in-scattering self-energy; an out-scattering self-energy; an advanced self-energy; a causal self-energy; or an anti-causal self-energy. In some embodiments, the set of Büttiker probes include at least one of a constant, energy dependent function, momentum dependent function, or spatial dependent function. The properties of particles of example 2 include at least one of distribution function, optical response function, charge response function, magnetic response function, general susceptibility function or screening properties. In one or more embodiments, the distribution function comprises at least one of momentum distribution, energy distribution, or spatial distribution. The particular relation of example 2 includes at least one of: polynomial expressions, differential expressions, or integro-differential expressions.

Example 3

A software architecture encoded on a non-transitory computer readable medium, the software architecture processing a method, wherein the method includes defining initial conditions for a set of Büttiker probes, wherein the set of Büttiker probes include various interaction equations between one or several many-body systems. Additionally, the method includes computing properties of particles with quantum transport methods, wherein a quantum transport method of the quantum transport methods include a set of Büttiker probes, wherein the particles include the particles of one or several many-body systems. Further, the method includes calculating a current for each Büttiker probe of the set of Büttiker probes, wherein the current includes at least one of momentum current, particle current, energy current, spin current, color charge or chirality current. Moreover, the method includes setting up a set of continuity equations such that for each continuity equation a calculated current of a Büttiker probe is in a particular relation with an another calculated current of an another Büttiker probe. Furthermore, the method includes redefining conditions for a second set of Büttiker probes such that each continuity equation of the set of continuity equations is conserved, wherein each continuity equation is conserved with a corresponding Büttiker probe of the second set of Büttiker probes.

The set of continuity equations includes at least one continuity equation. In one or more embodiments, each continuity equation of the set of continuity equation is dependent upon the computed properties of the particles. In at least one embodiment, the set of continuity equations include at least one of: particle continuity, energy conservation, momentum conservation, angular momentum conservation, spin conservation, or an n-th order momentum conservation, where n is greater than 2. In some embodiments, at least one of continuity equation of the set of continuity equations depends on at least one of the computed properties of particles. In some embodiments, at least one of continuity equation of the set of continuity equations depends on at least one of the properties of particles. The initial conditions of example 3 include at least one of temperature, chemical potential, electrostatic potential, mobility, particle distribution, interaction strengths, energy distribution, intrinsic correlation between multiple Büttiker probes, or momentum distribution. The quantum transport methods include at least one of: a non-equilibrium Green's function method; a density matrix method; a quantum Monte Carlo method; a Wigner function method; a Monte Carlo method; or a Boltzmann transport method.

In some embodiments, the set of Büttiker probes includes at least one Büttiker probe. The set of Büttiker probes includes at least one of a self-energy; a retarded self-energy; an in-scattering self-energy; an out-scattering self-energy; an advanced self-energy; a causal self-energy; or an anti-causal self-energy. In some embodiments, the set of Büttiker probes include at least one of a constant, energy dependent function, momentum dependent function, or spatial dependent function. The properties of particles of example 3 include at least one of distribution function, optical response function, charge response function, magnetic response function, general susceptibility function or screening properties. In one or more embodiments, the distribution function comprises at least one of momentum distribution, energy distribution, or spatial distribution. The particular relation of example 3 includes at least one of: polynomial expressions, differential expressions, or integro-differential expressions.

Example 4

A software architecture includes a first procedure, wherein the first procedure is configured to define initial conditions for a set of Büttiker probes. The set of Büttiker probes include various interaction equations between one or several many-body systems. Additionally, the software architecture includes a second procedure, wherein the second procedure is configured to compute properties of particles with quantum transport methods. A quantum transport method of the quantum transport methods include a set of Büttiker probes. The particles include the particles of one or several many-body systems. Further, the software architecture includes a third procedure, wherein the third procedure is configured to calculate a current for each Büttiker probe of the set of Büttiker probes. The current includes at least one of momentum current, particle current, energy current, spin current, color charge or chirality current. Moreover, the software architecture includes a fourth procedure, wherein the fourth procedure is configured to set up a set of continuity equations such that for each continuity equation a calculated current of a Büttiker probe is in a particular relation with an another calculated current of an another Büttiker probe. Furthermore, the software architecture includes a fifth procedure, wherein the fifth procedure is configured to redefine conditions for a second set of Büttiker probes such that each continuity equation of the set of continuity equations is conserved. Each continuity equation is conserved with a corresponding Büttiker probe of the second set of Büttiker probes.

The set of continuity equations includes at least one continuity equation. In one or more embodiments, each continuity equation of the set of continuity equation is dependent upon the computed properties of the particles. In at least one embodiment, the set of continuity equations include at least one of: particle continuity, energy conservation, momentum conservation, angular momentum conservation, spin conservation, or an n-th order momentum conservation, where n is greater than 2. In some embodiments, at least one of continuity equation of the set of continuity equations depends on at least one of the computed properties of particles. In some embodiments, at least one of continuity equation of the set of continuity equations depends on at least one of the properties of particles. The initial conditions of example 4 include at least one of temperature, chemical potential, electrostatic potential, mobility, particle distribution, interaction strengths, energy distribution, intrinsic correlation between multiple Büttiker probes, or momentum distribution. The quantum transport methods include at least one of: a non-equilibrium Green's function method; a density matrix method; a quantum Monte Carlo method; a Wigner function method; a Monte Carlo method; or a Boltzmann transport method.

In some embodiments, the set of Büttiker probes includes at least one Büttiker probe. The set of Büttiker probes includes at least one of a self-energy; a retarded self-energy; an in-scattering self-energy; an out-scattering self-energy; an advanced self-energy; a causal self-energy; or an anti-causal self-energy. In some embodiments, the set of Büttiker probes include at least one of a constant, energy dependent function, momentum dependent function, or spatial dependent function. The properties of particles of example 4 include at least one of distribution function, optical response function, charge response function, magnetic response function, general susceptibility function or screening properties. In one or more embodiments, the distribution function comprises at least one of momentum distribution, energy distribution, or spatial distribution. The particular relation of example 4 includes at least one of: polynomial expressions, differential expressions, or integro-differential expressions.

Example 5

The non-equilibrium Green function (NEGF) method is capable of nanodevice performance predictions including coherent and incoherent effects. To treat incoherent scattering, carrier generation and recombination is computationally very expensive. In this example, the numerically efficient Büttiker-probe model is expanded to cover recombination and generation effects in addition to various incoherent scattering processes. The capability of the new method to predict nanodevices is exemplified with quantum well III-N light-emitting diodes and anti-ambipolar 2D material heterojunctions.

As the scaling of MOSFET and new discoveries in nanodevices, the non-equilibrium Green function (NEGF) method is shown to be necessary to account for quantum mechanical wave behaviors. Different physics can be simultaneously taken into account in one universal picture including coherent and incoherent effects. Carrier recombination and generation (RG) are the fundamental processes that allow solar cell and light emitting diodes (LED) technology. The interplay between radiative, Auger and Shockley-Read-Hall (SRH) recombination determine the efficiency of the device. RG also affects the off-current and performance across all different devices. RG is therefore included to accurately capture the device performance.

Current conservation equation is usually satisfied in the drift-diffusion framework while either missing or too computationally intensive and therefore neglected in the NEGF framework. Typically, treating incoherent scattering, carrier generation and recombination in NEGF is computationally very expensive since it involves several nonlinear and highly dimensional integro-differential equations. In contrast, drift-diffusion (DD) models, with or without quantum corrections, have been the industrial standard for TCAD due to their efficiency. The Büttiker-probe model represents a good compromise between the accuracy of NEGF and the efficiency of heuristic thermalization models.

In this example, the charge self-consistent NEGF Büttiker-probe model is expanded to include carrier recombination and generation effects. Several objectives are achieved with this method. First, atomic resolved recombination/generation effects such as Shockley-Read-Hall, radiative, and Auger recombination are incorporated into NEGF. Second, an alteration of the Büttiker-probe convergence criterion carefully satisfies the continuity equations—also in the presence of carrier recombination and generation.

Note that atomically, energy and/or momentum resolved observables that give deep insight into the nanodevice physics and represent an important feature of NEGF are available just like with expensive self-consistent Born models.

Two models are used in this example: the Büttiker probe recombination and generation model (BPRG) method in NEMO5 and the drift-diffusion (DD) based model from Atlas.

The new BPRG method is based on the traditional Büttiker probe formalism with the adaptation within the recursive Green's function. Resolved contacts are added along the device for phase breaking to mimic different scattering mechanisms. The solution is reached by iteratively solving for the probe Fermi levels such that each probe current is zero to conserve particles.

In Eq. 1, $\Sigma_\eta^R$ is the self-energy matrix containing the imaginary $\eta$ as the Büttiker probes contacts. The $\eta$ is related to the scattering rate which covers, namely, acoustic phonons, polar optical phonons, electron-electron interactions. The magnitude of the $\eta$ can be corresponded to the scattering rates. To prevent additional states created in the bandgap, the $\eta$ is energy dependent, exponentially decaying in the band gap, to mimic the urbach tail.

$$\sum_\eta^R (x, E) = \begin{cases} \eta \cdot e^{\frac{-E_C(x)-E}{\lambda}}, & E < E_C \\ \eta, & E > E_C \end{cases} \quad (1)$$

In Eq. 1, $\Sigma_S^R$ and $\Sigma^R$ are the contact self-energy. Sancho-Rubio method is used iteratively in searching the surface green function. An $\eta$ was added in the original paper for the convergence stability of the iterative scheme. Due to the device self energy, we have purposely matched the $\eta$ such that a semi-infinite contact extending from the device can be achieved.

Figure 2:
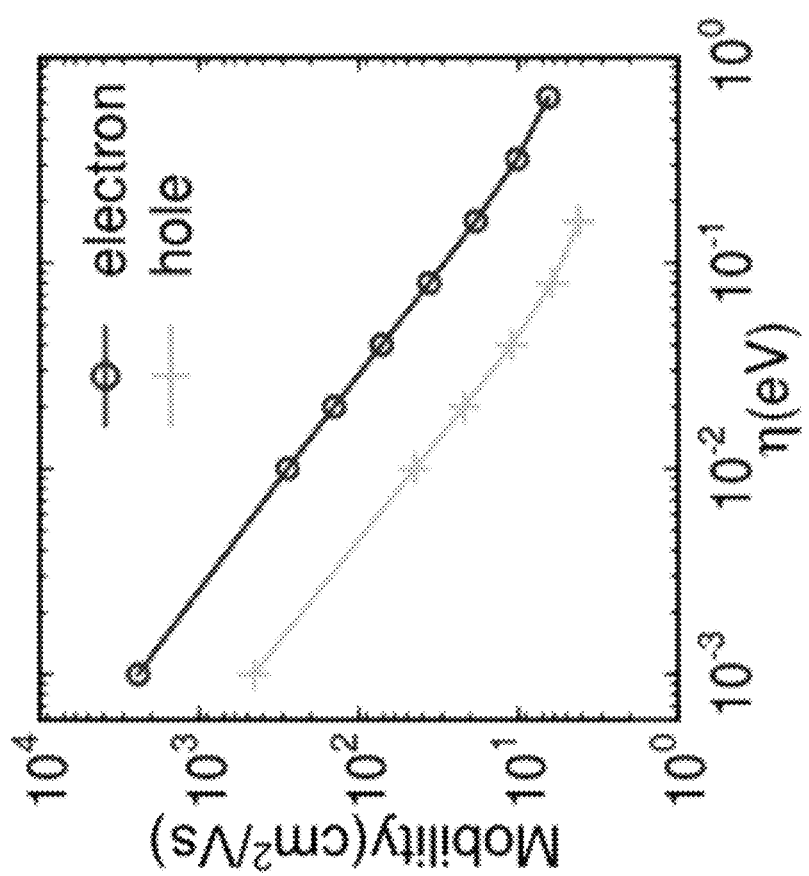
FIG. 2 illustrates mobility as a function of the $\eta$ is calculated in a homogeneous semiconductor with p and n doping density of $10^{20}/cm^3$.

With $\eta$ mimicking the scattering, the carriers in the device can be scattered with energy loss travelling through a homogeneous doped material. The quantity of $\eta$ can be further justified by matching experimentally observed mobility. The transport calculation should be done with small bias, $10^{-2}$ eV, applied across the device with free carriers matching doping level by finding the correct potential by, e.g., solving Poisson equation. With $R(L)=V_{sd}/1(L)$, the resistance can be calculated for different device lengths as shown in FIG. 2. The slope of R(L) can deduct the resistivity($\rho$) as in Eq. 1 below. Mobility can be calculated by Eq. 2 below.

$$\rho = \frac{dR}{dL} \quad (2)$$

$$\rho = \frac{1}{q(\mu_n n + \mu_p p)} \quad (3)$$

BPRG method can tackle bipolar devices with not only two carrier types, electrons and holes, but also their interaction. Here is the algorithm for an iteration of the current conservation loop: (1) Two sets of Büttiker probes are set up each covering the electron and hole energy range. Electron and hole carrier density is calculated. (2) Different recombination processes ($J_m^R$) is calculated with ABC equations however can be extended for more sophisticated models. Generation rate ($J_m^G$) can also be calculated according to the photon absorption. (3) Probe Fermi levels $\mu_{nj}$ and $\mu_{pj}$ are updated via Newton method to approach the current conservation Eqns.

$$I_{nm} = I_{pm} = J_m^G + J_m^R \quad (4)$$

The above iteration is repeated until finally the current conservation achieved. A self-consistent charge iteration is further coupled with the Poisson equation.

Comparison with semi-classical solver: Drift-diffusion (DD) is used for device A with smooth band structure. While, with quantum well structure, we use both the pure DD and DD with correction model (DD+qwell). Qwell solves for the bound state in the QW while DD solves for the continuum states which are coupled via capture-escaped model. The electron/hole capture time is derived by $\eta$ vs $\tau$ relationship.

Two devices are simulated in this example. Device A is a pn diode composed of p and n doped 10 nm GaN with the concentration of $10^{20}/cm^3$. Device B is based on device A but with the center 2.8 nm replaced by intrinsic $In_{0.13}Ga_{0.87}N$. Both devices are periodic in the transverse directions. To be comparable, the two models utilize the same effective mass for GaN of $m_e=0.2^*$ and $m_h=1.25$ m*. The parameters for the ABC equations are $A=2.6\times10^6$ s$^{-1}$, $B=1.48\times10^{-11}$ cm$^3$ s$^{-1}$ and $C=1.6\times10^{-30}$ cm$^6$ s$^{-1}$ for both models. The mobility is set to be $\mu_e=56.88$ cm$^2$/(V$_s$) and $\mu_h=10.0$ cm$^2$/(V$_s$) in the DD where equivalently, $\eta_e=0.05$ eV and $\eta_h=0.64$ eV are set for the scattering self-energy in the BPRG model.

Figure 3:
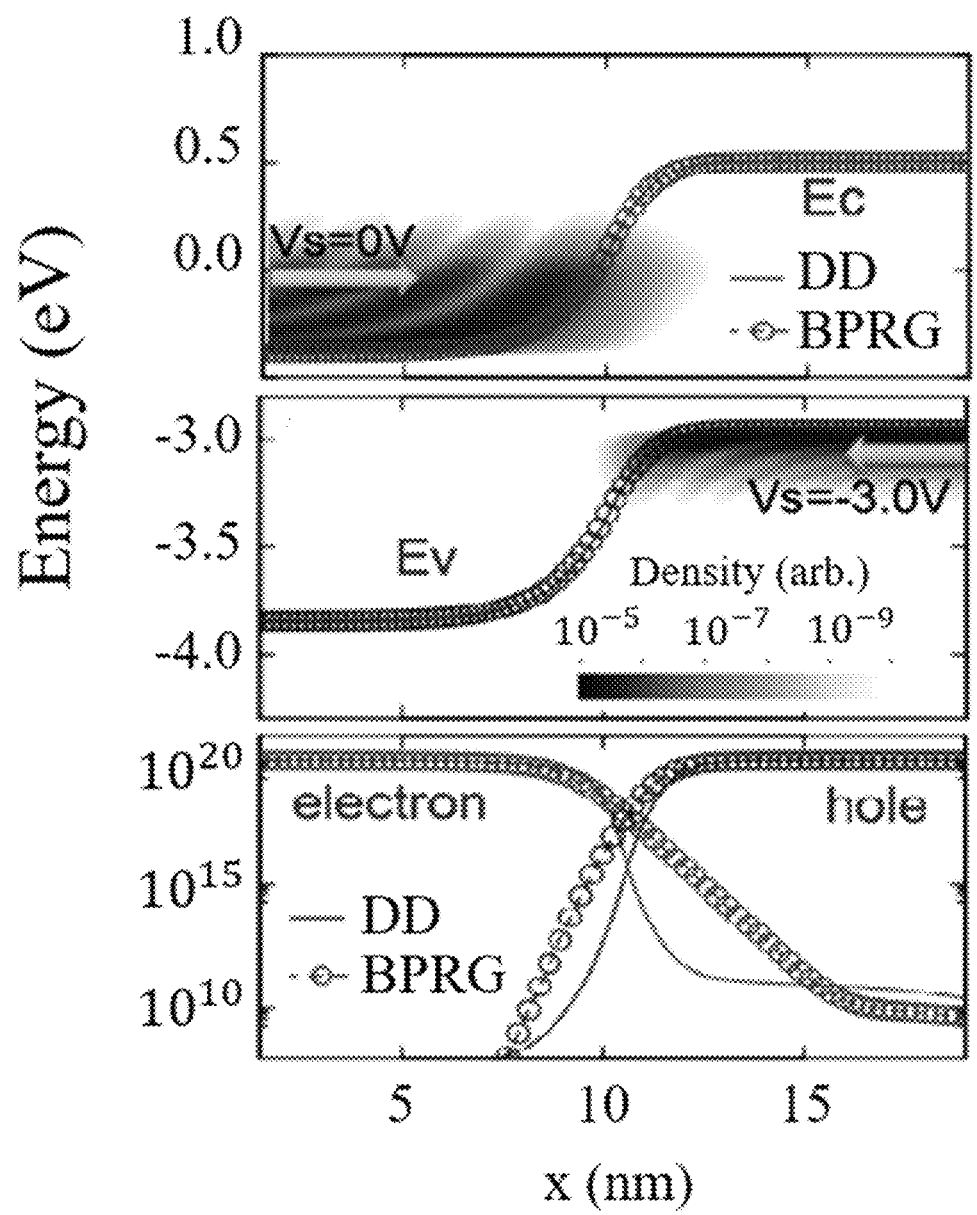
FIG. 3 illustrates hole and electron density comparison between drift diffusion (DD) and NEGF at Vd=3V.

Three instances are given with the BPRG model to provide insights into the pro and cons: for device A, the charge consistent calculated bandstructures are compared between the DD and BPRG in FIG. 3. The resulting charge distribution is compared in FIG. 3. The bandstructures have good agreement between the two models however, the charge from BPRG is much higher in the barriers where the discrepancy is higher for electron. This is due to the tunneling of the carriers into the barrier as shown in the contour plot in FIG. 3. On the contrary, DD assumes carriers to be particle like and therefore fail to capture the wave effects of the carrier.

Figure 4:
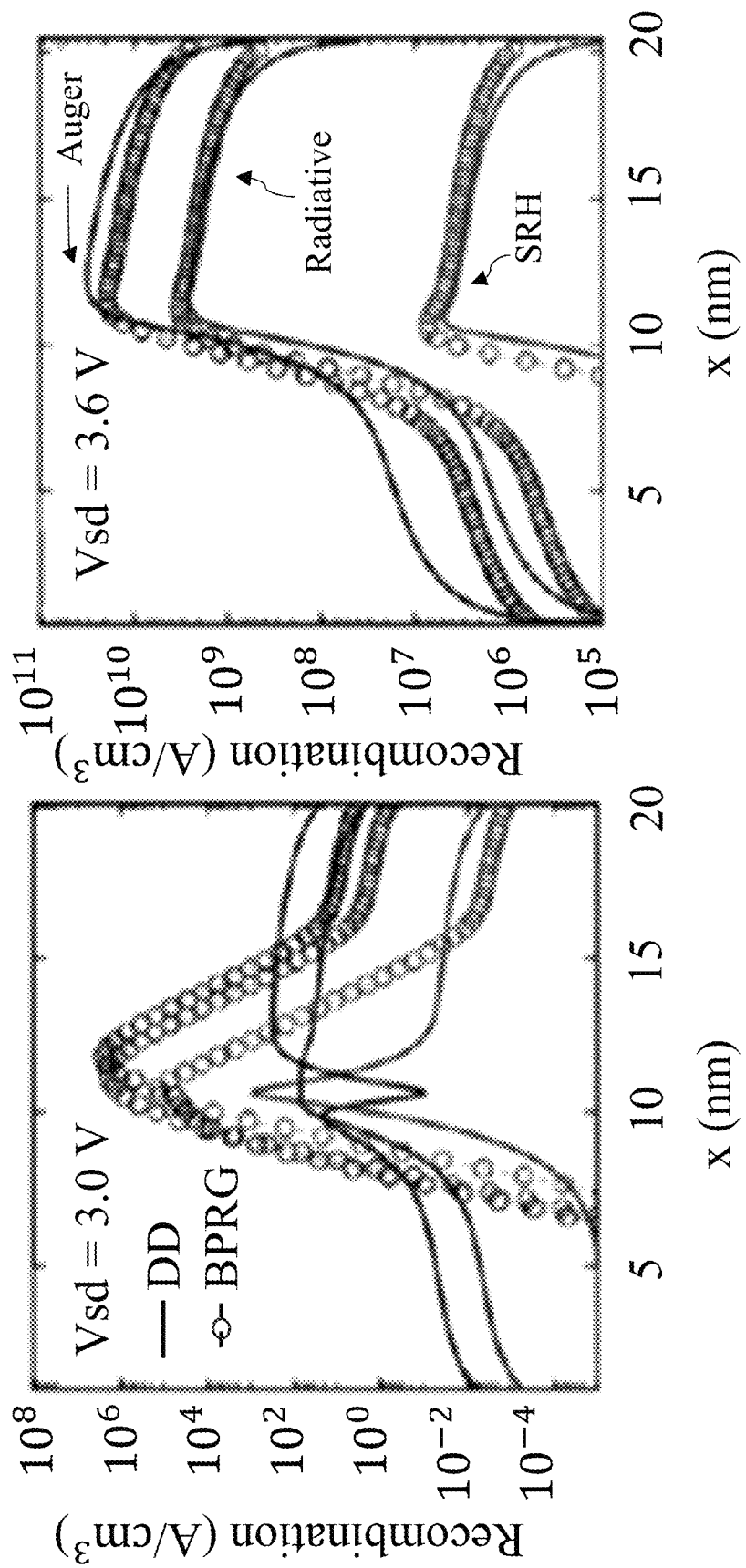
FIG. 4 illustrates recombination rates comparison between quantum transport and drift diffusion (DD) for pn diode biased 3 V and 3.6V with device A.

The recombination current, as a function of charge distribution, are therefore different as shown in FIG. 4. For lower bias, the BPRG calculated recombination is higher while for higher bias the two show smaller difference.

Figure 5:
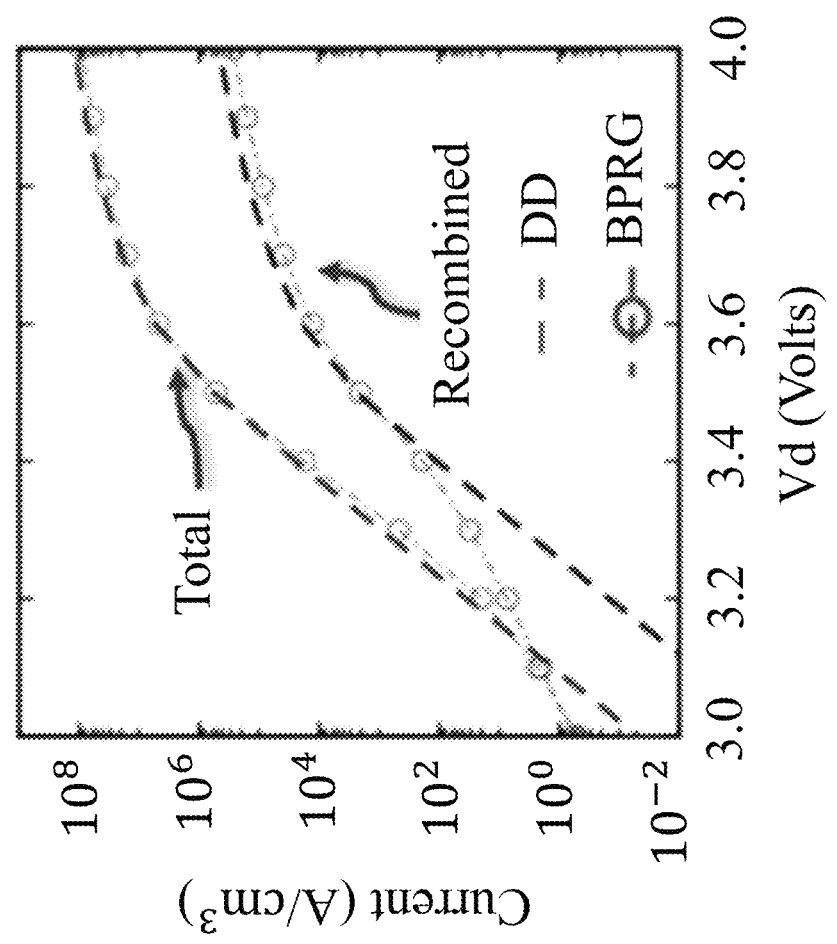
FIG. 5 illustrates current-voltage characteristics predicted within quantum transport of NEMO5 and drift diffusion (DD) with device B.

IV curve is further compared between the two model in FIG. 5. For each model, two kinds of current are shown. First is the recombination current where both particles exit through the probes equally dominating at a low bias. Second is the thermionic current where carriers leaves the device by overcoming the built in potential barrier which dominates at higher bias points. An excellent agreement is shown for the higher bias which gives us the confidence in this model. However, BPRG deviates at the lower bias due to the recombination current difference results from the missing tunnel charges from the semiclassical solver. The ideality factor, as an important parameter for the diode, is therefore predicted differently.

Figure 6A:
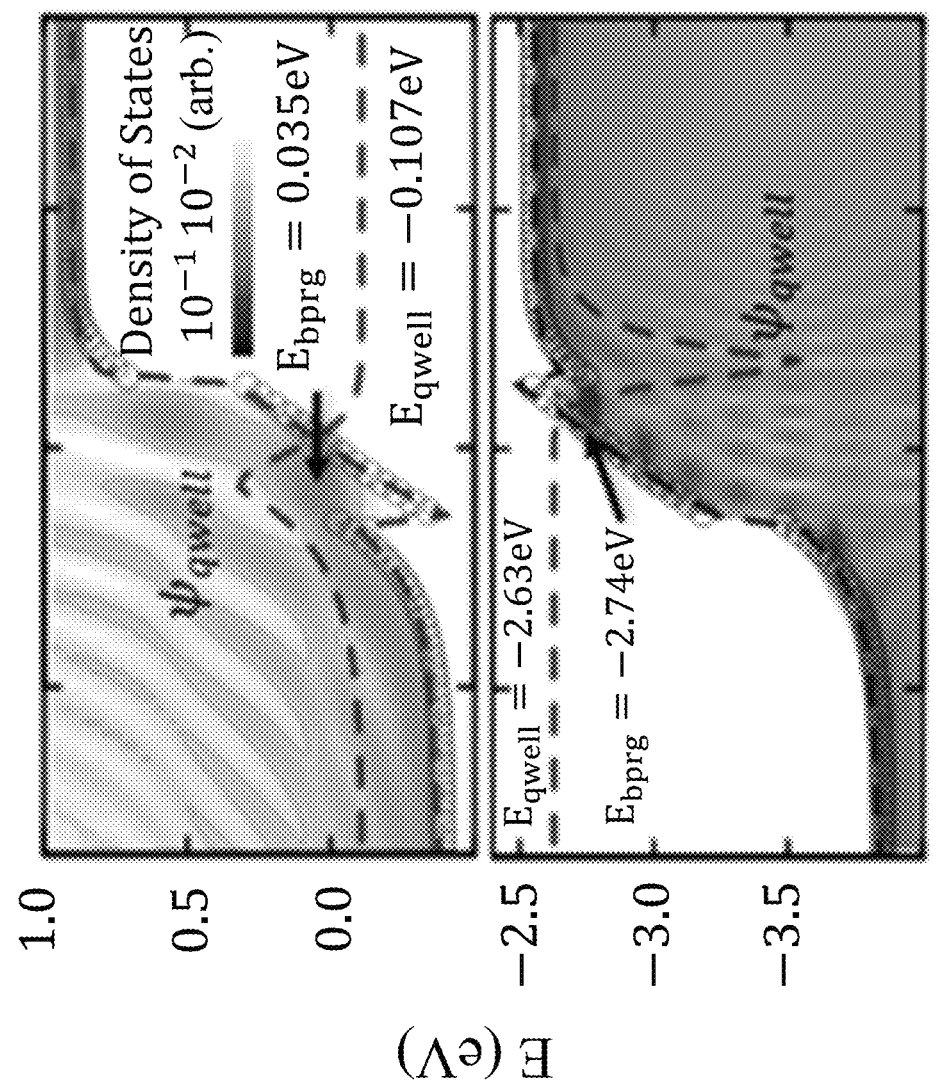
FIG. 6(a) illustrates conduction bands and valence band comparison between the DD+Qwell model and BPRG for device B at Vsd=2.6V.
Figure 6B:
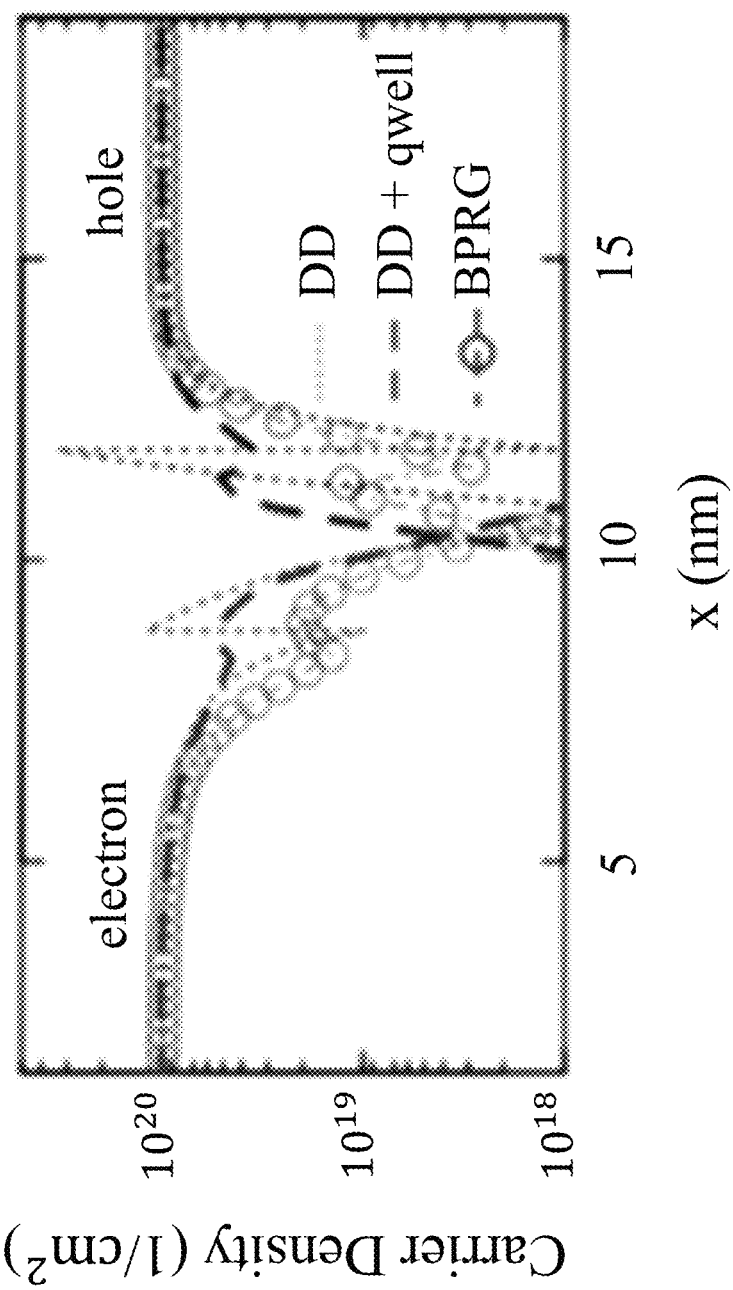
FIG. 6(b) illustrates charge density comparison between BPRG, DD, and DD+qwell models.

PN junction with Q-: With the addition of the QW, DD fails to address nanostructure as shown in FIG. 6($b$) whose charge concentrate at the edge of the QW. With Qwell model, charge distribution is corrected to be more centered in the QW as affected by the normalized ground state wavefunction shown in FIG. 6($a$). With BPRG model, the confined states's energy is extracted from the contour graph and shown to be different values compared to the one predicted from the Qwell due to the enforced Dirichlet B.C. vs. the entirely NEGF calculated result. The difference in the confined states energy and wavefunction results in different state filling and therefore explains the discrepancy in density in QW as in FIG. 6($b$).

Figure 7A:
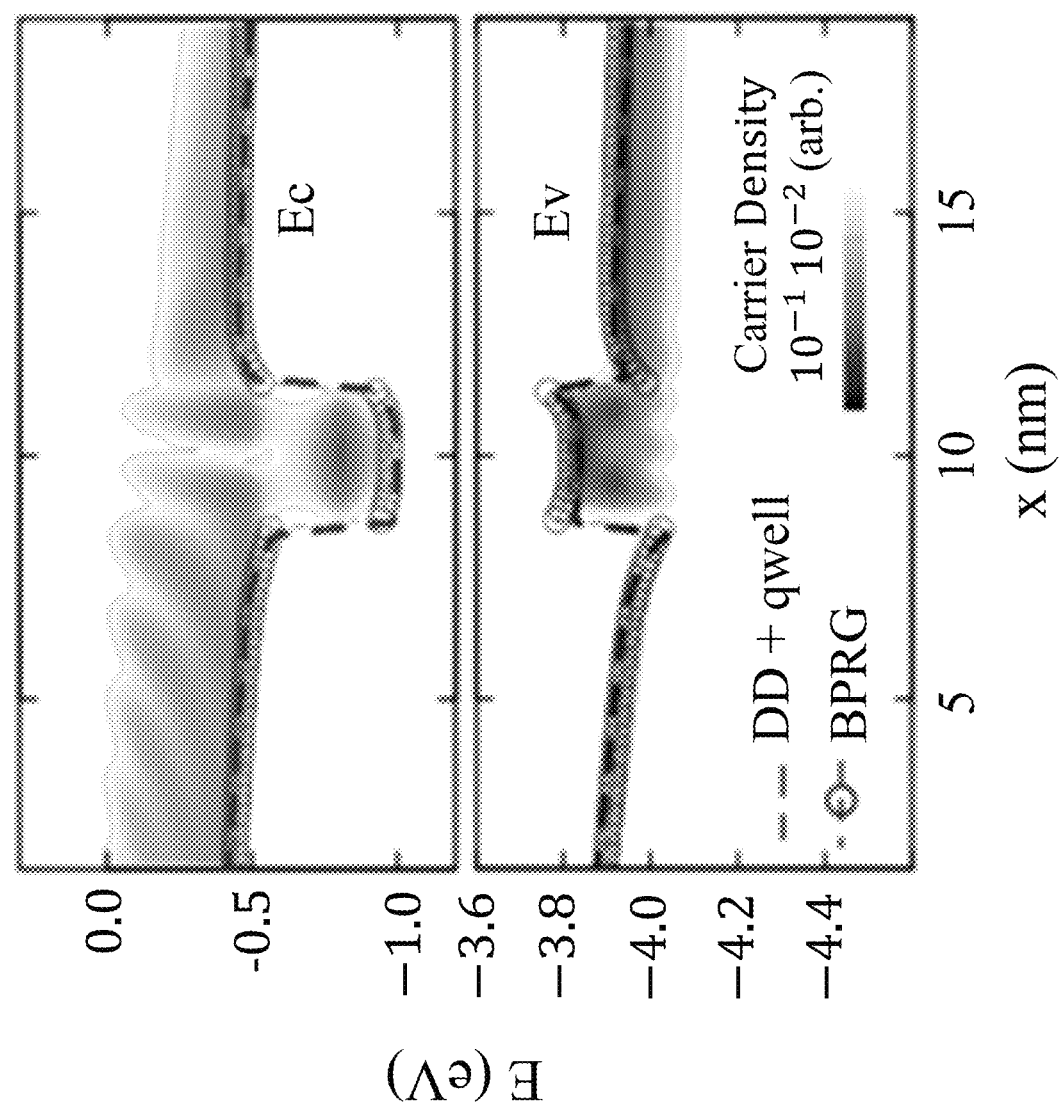
FIG. 7(a) illustrates conduction bands and valence band comparison between the DD+Qwell model and BPRG overlaid with the energy resolved density at Gamma point from BPRG model for device B with Vsd=4.0V.
Figure 7B:
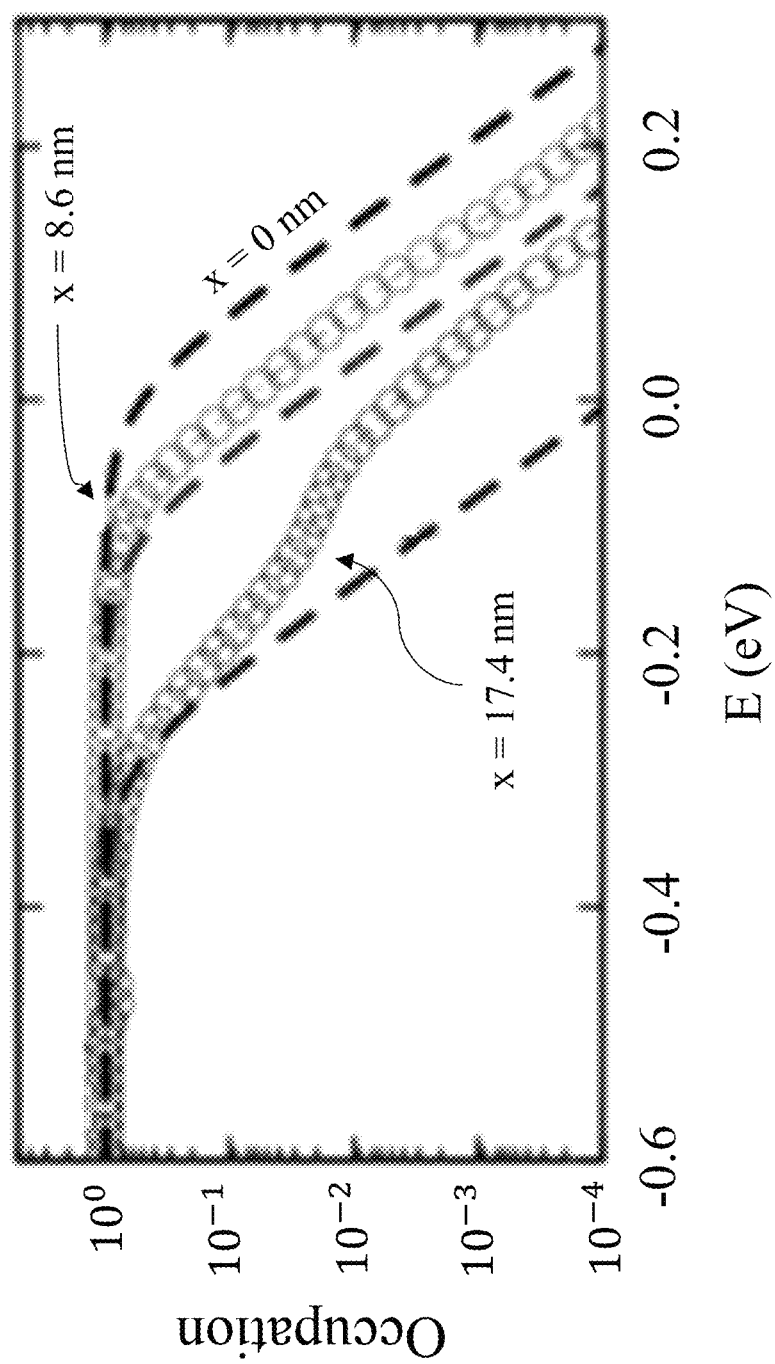
FIG. 7(b) illustrates electron occupation from BPRG and DD+qwell at various locations.
Figure 8A:
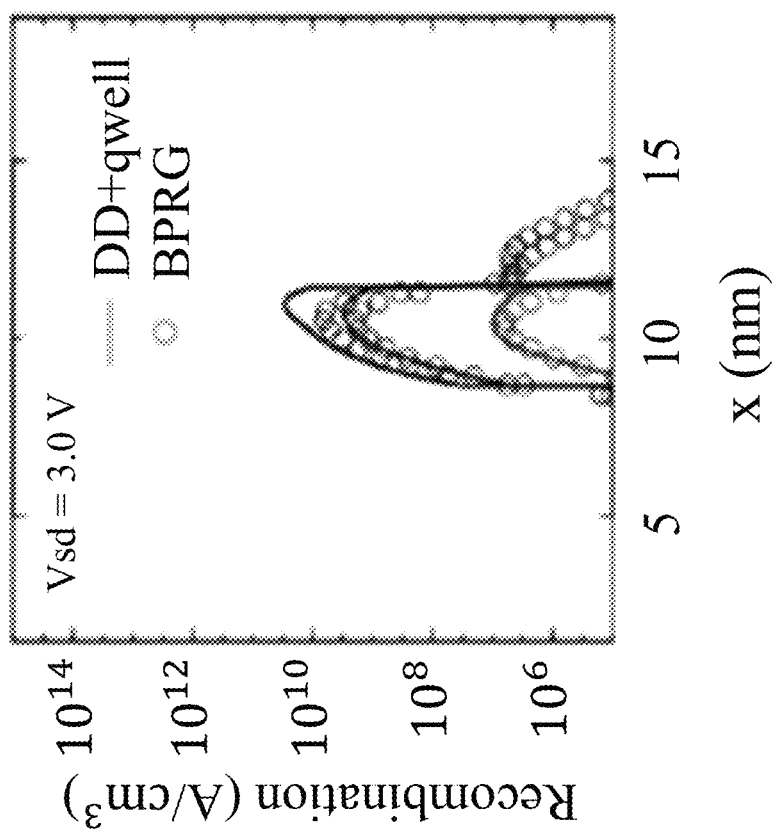
FIG. 8(a) illustrates position resolved recombination rates at Vsd=3.0V, comparing the BPRG and DD models for device B.
Figure 8B:
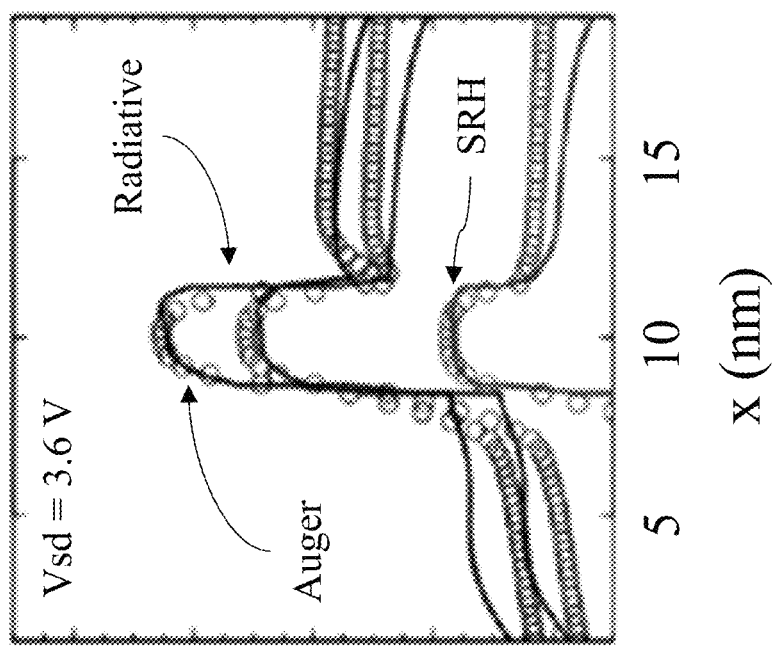
FIG. 8(b) illustrates position resolved recombination rates at Vsd=3.6V, comparing the BORG and DD models for device B.
Figure 9:
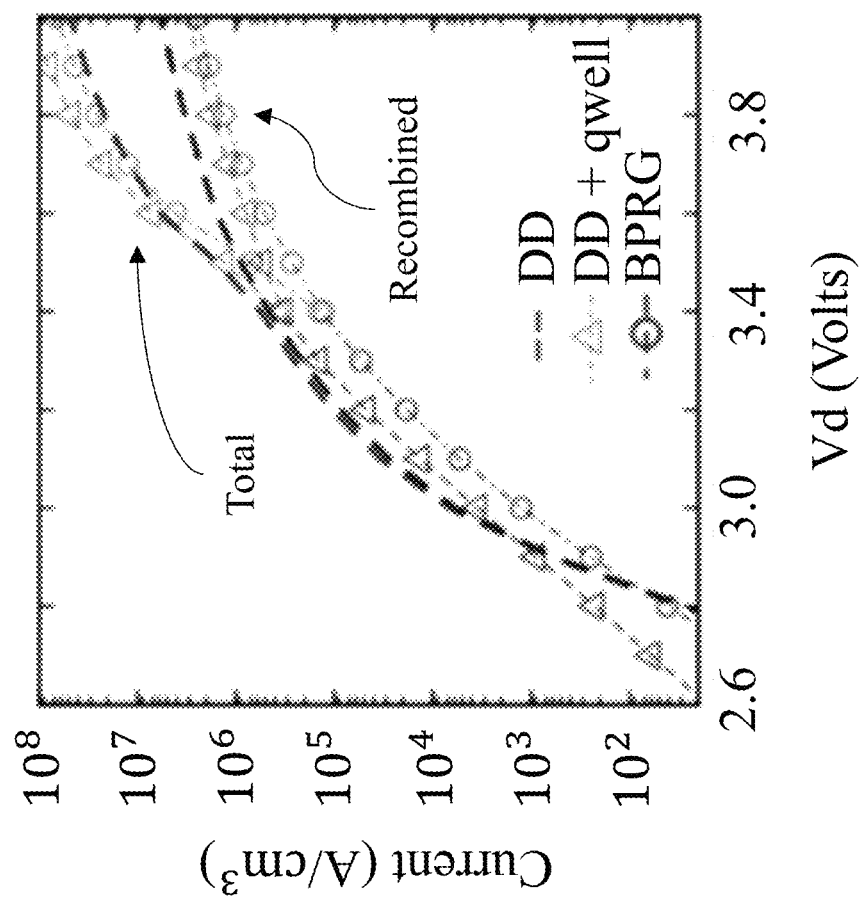
FIG. 9 illustrates IV curve comparisons of DD, DD+Qwell, and BPRG for device B.

The occupancy of the states is analyzed and calculated as density/(density of states) shown in FIG. 7($b$) at location and bias corresponding to FIG. 7($a$). For DD based solver, carriers are forced to relax at any location to local quasi Fermi level. While for BPRG, non-equilibrium is allowed where carriers are relaxed according to the scattering rates assigned. The high energy electrons are shown to exist and can contribute difference to the electronic potential with the Poisson.

Figure 10:
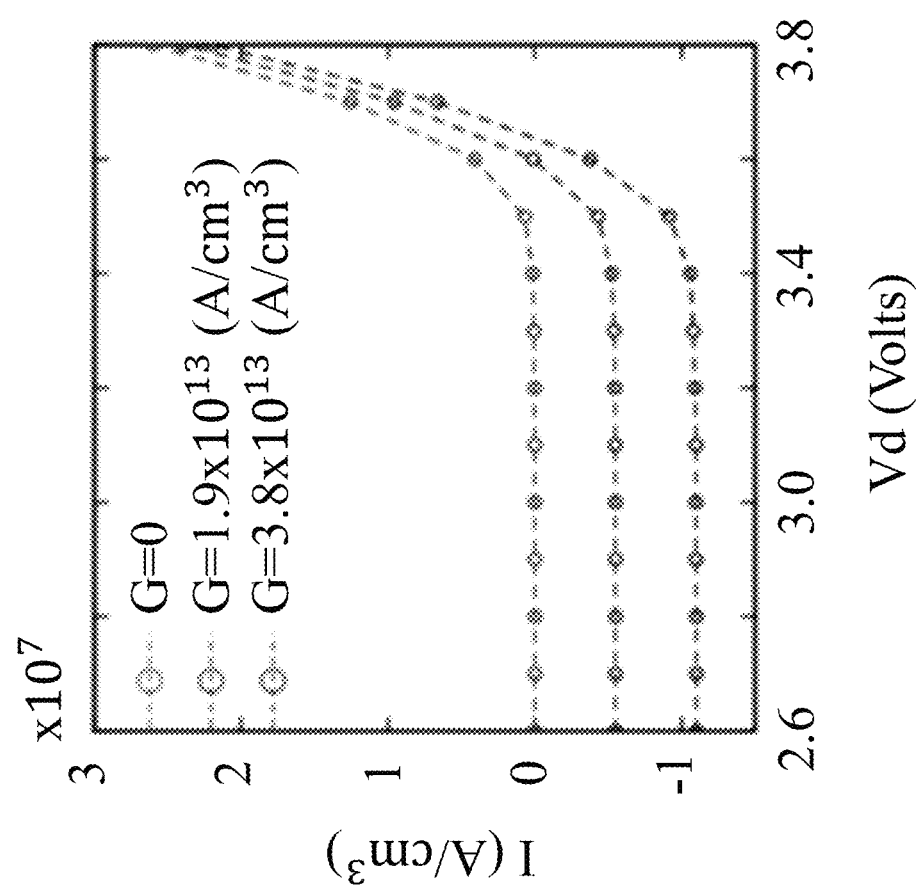
FIG. 10 illustrates IV curve comparisons of DD, DD+Qwell, and BPRG for device B.

The recombination current is shown in FIG. 10 with both models agreeing on the general trends. First, Auger recombination is shown to dominate in the QW as carrier increase sharply. Secondly, the position resolved recombination current agree in magnitudes however shows difference at interface of QW. The IV comparison for the device is shown in FIG. 10. For larger bias regime, thermionic current is dominant where the reflection due to the QW is neglected in the DD+qwell model which overestimated the current. For smaller bias regime, the recombination is dominant and predicting larger current agreeing with the trend in FIG. 10.

PN junction with QW under illumination—Device B is used with constant generation rate profile imposed in the quantum well region. The typical solar cell IV curve is shown where the IV is shifted down proportional to the generation rate.

Example 6

Figure 11:
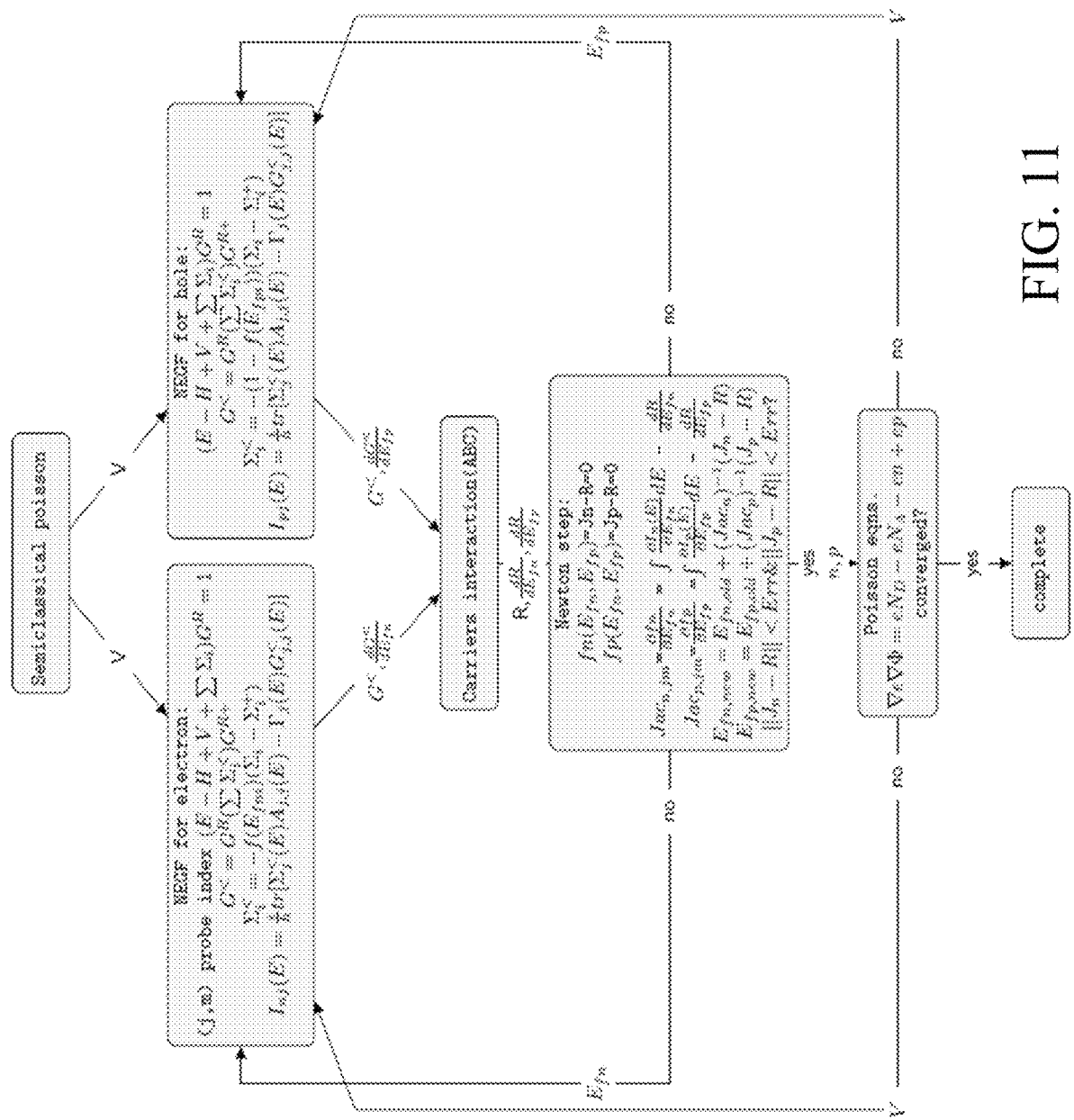
FIG. 11 illustrates a flowchart of modeling interactions between many particles, in accordance with one or more embodiments.

FIG. 11 illustrates a flowchart of modeling interactions between many particles, in accordance with one or more embodiments.

Figure 12:
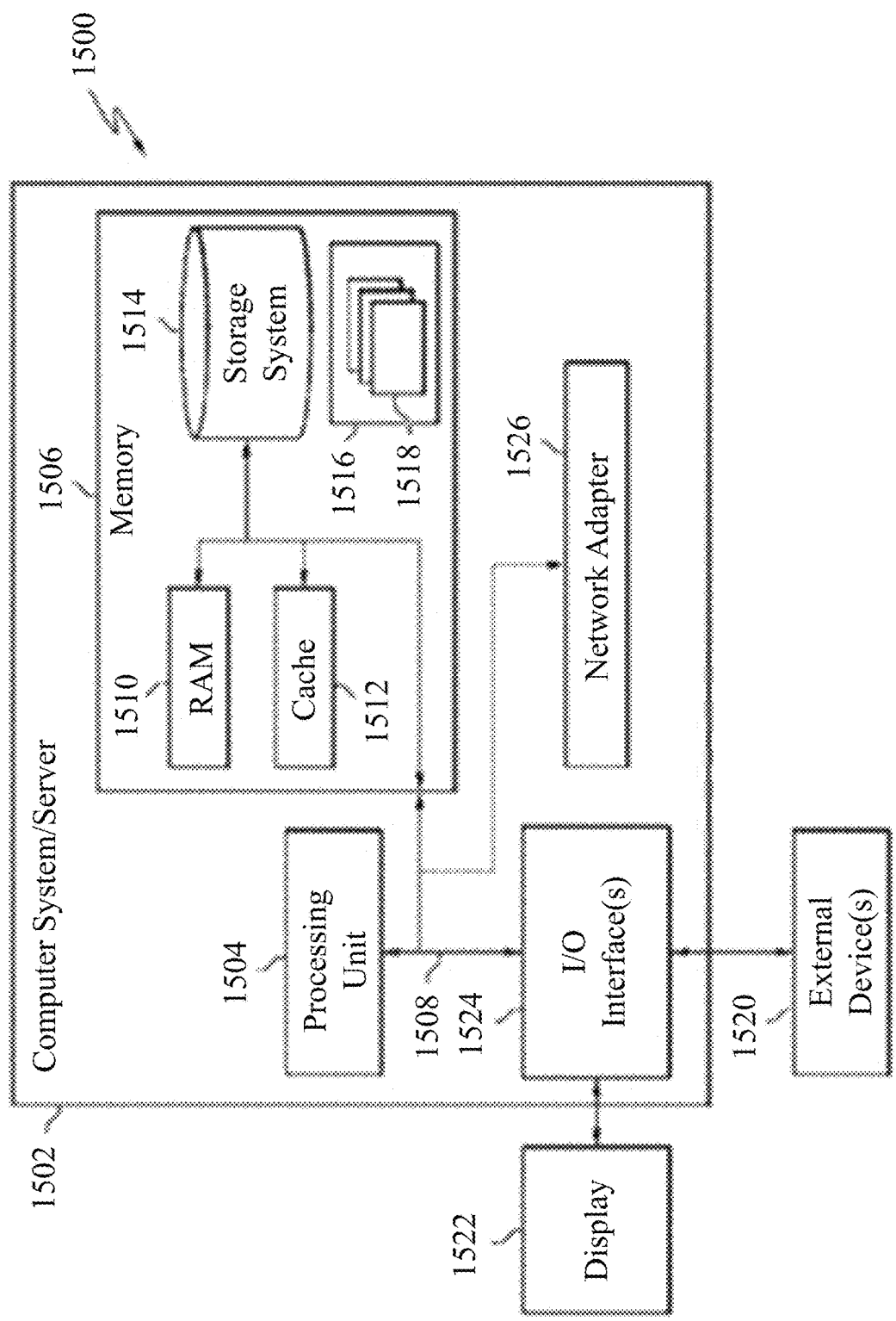
FIG. 12 illustrates one example of a computing or processing node 1500 for operating a method or a software architecture in accordance with the present application.

FIG. 12 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A software architecture encoded on a non-transitory computer readable medium, the software architecture processing a physics-based approximation method of modeling interactions between particles, wherein the method comprises:
  defining initial conditions for a set of Büttiker probes, wherein each Büttiker probe of the set of Büttiker probes includes various interaction equations between at least one of electrons, holes, photons, and phonons;
  initiating a quantum transport method to determine properties of particles interacting with the set of Büttiker probes, wherein the particles include at least one of electrons, holes, photons, and phonons;

quantifying a set of Büttiker probe current input values by calculating a current for each Büttiker probe of the set of Büttiker probes, wherein the current includes at least one of momentum current, particle current, energy current, spin current, and chirality current;

forming a set of continuity equations, using the set of Büttiker probe current input values, such that for each continuity equation a first calculated current of a first Büttiker probe of the set of Büttiker probes is in a particular relation with a second calculated current of a second Büttiker probe of the set of Büttiker probes; and modeling an interaction between the particles based on the set of continuity equations calculated from the physics-based approximation to improve computational efficiency.

2. The method of claim 1, wherein each continuity equation of the set of continuity equations is dependent upon the properties of the particles.

3. The method of claim 1, wherein the initial conditions comprise at least one of temperature, chemical potential, electrostatic potential, mobility, particle distribution, interaction strengths, energy distribution, intrinsic correlation between multiple Büttiker probes of the set of Büttiker probes, and momentum distribution.

4. The method of claim 1, wherein the quantum transport method includes at least one of:
a non-equilibrium Green's function method;
a density matrix method;
a quantum Monte Carlo method;
a Wigner function method;
a Monte Carlo method; and
a Boltzmann transport method.

5. The method of claim 1, wherein the set of Büttiker probes comprises at least one Büttiker probe.

6. The method of claim 1, wherein the properties of the particles include at least one of a distribution function, an optical response function, a charge response function, a magnetic response function, a general susceptibility function and screening properties.

7. The method of claim 6, wherein the distribution function includes at least one of momentum distribution, energy distribution, and spatial distribution.

8. The method of claim 1, wherein the set of Büttiker probes include at least one of:
a self-energy;
a retarded self-energy;
an in-scattering self-energy;
an out-scattering self-energy;
an advanced self-energy;
a causal self-energy; and
an anti-causal self-energy.

9. The method of claim 1, wherein the set of Büttiker probes include at least one of a constant, energy dependent function, momentum dependent function, and spatial dependent function.

10. The method of claim 1, wherein the set of continuity equations include at least one of: particle continuity, energy conservation, momentum conservation, angular momentum conservation, spin conservation, and an n-th order momentum conservation, where n is greater than 2.

11. The method of claim 1, wherein the set of continuity equations includes at least one continuity equation.

12. The method of claim 1, wherein the particular relation includes at least one of polynomial expressions, differential expressions, and integro-differential expressions.

13. The method of claim 1, comprising:
redefining conditions for a second set of Büttiker probes such that each continuity equation of the set of continuity equations is conserved, wherein each continuity equation is conserved with a corresponding Büttiker probe of the second set of Büttiker probes.

14. The method of claim 1, wherein at least one continuity equation of the set of continuity equations depends on at least one of the properties of the particles.

15. A software architecture encoded on a non-transitory computer readable medium, the software architecture processing a method, wherein the method comprises:
defining initial conditions for a set of Büttiker probes, wherein each Büttiker probe of the set of Büttiker probes includes various interaction equations between one or several many-body systems;
initiating a quantum transport method to determine properties of particles interacting with the set of Büttiker probes, wherein the particles are associated with one or several many-body systems;
quantifying Büttiker probe current input values by calculating a current for each Büttiker probe of the set of Büttiker probes, wherein the current includes at least one of momentum current, particle current, energy current, spin current, color charge and chirality current; and
modeling an interaction between the particles by forming a set of continuity equations, using the Büttiker probe current input values, such that for each continuity equation a first calculated current of a first Büttiker probe of the set of Büttiker probes is in a particular relation with a second calculated current of a second Büttiker probe of the set of Büttiker probes.

16. The method of claim 15, wherein each continuity equation of the set of continuity equations is dependent upon calculated properties of the particles.

17. The method of claim 15, wherein the initial conditions include at least one of temperature, chemical potential, electrostatic potential, mobility, particle distribution, interaction strengths, energy distribution, intrinsic correlation between multiple Büttiker probes, magnetic moment, and momentum distribution.

18. The method of claim 15, comprising:
redefining conditions for a second set of Büttiker probes such that each continuity equation of the set of continuity equations is conserved, wherein each continuity equation is conserved with a corresponding Büttiker probe of the second set of Büttiker probes.

19. A software architecture encoded on a non-transitory computer readable medium, the software architecture processing a method, wherein the method comprises:
defining initial conditions for a first set of Büttiker probes, wherein each Büttiker probe of the first set of Büttiker probes includes various interaction equations between one or several many-body systems;
initiating a quantum transport method to determine properties of particles interacting with the first set of Büttiker probes, wherein the particles are associated with of one or several many-body systems;
quantifying Büttiker probe current input values by calculating a current for each Büttiker probe of the first set of Büttiker probes, wherein the current includes at least one of momentum current, particle current, energy current, spin current, color charge and chirality current;
modeling an interaction between the particles by forming a set of continuity equations, using the Büttiker probe current input values, such that for each continuity equation a first calculated current of a first Büttiker probe of the first set of Büttiker probes is in a particular relation with a second calculated current of a second Büttiker probe of the first set of Büttiker probes; and redefining conditions for a second set of Büttiker probes such that each continuity equation of the set of continuity equations is conserved, wherein each continuity equation of the set of continuity equations is conserved with a corresponding Büttiker probe of the second set of Büttiker probes.

\* \* \* \* \*